United States Patent Office 2,987,554
Patented June 6, 1961

2,987,554
PROCESS FOR PREPARING A LIQUID REACTION PRODUCT OF AN ALKYL HALIDE AND A PENTABORANE

Arthur Levy, Worthington, Ohio, and Earl A. Weilmuenster, Kenmore, N.Y.; said Levy assignor, by mesne assignments, to The Battelle Development Corporation, Columbus, Ohio, a corporation of Ohio, and said Weilmuenster assignor, by mesne assignments, to Olin Mathieson Chemical Corporation, a corporation of Virginia No Drawing. Filed Apr. 26, 1956, Ser. No. 580,963
6 Claims. (Cl. 260—606.5)

Our invention relates to the manufacture of new chemical compositions which are reaction products formed by the reaction of a mixture of pentaborane-9 and pentaborane-11, the mixture being predominantly pentaborane-11, with an alkyl halide in the presence of an alkylation catalyst. The compositions of our invention can be used as fuels.

It is known in the art to prepare both pentaborane-9 and pentaborane-11. Each is a colorless liquid, pentaborane-9 melting at −46.8° C. and pentaborane-11 melting at −123° C. Liquid pentaborane-9 is relatively stable, whereas liquid pentaborane-11 is not. Both pentaborane-9 and pentaborane-11 are boron hydrides or boranes, and the art is aware that the burning of a borane with oxygen liberates considerably more energy than the oxidation of a corresponding amount of hydrocarbon, producing very high flame temperatures. This suggests the use of pentaborane-9 and pentaborane-11 as fuels of very high energy content. Both pentaborane-9 and pentaborane-11 suffer from the disadvantage, among other things, however, that they have relatively high vapor pressures, the vapor pressure of pentaborane-9 being 66 mm. of mercury at 0° C. with a boiling point at atmospheric pressure of 58° C. and the vapor pressure of pentaborane-11 being 52.8 mm. of mercury at 0° C. with a boiling point at atmospheric pressure of 65° C.

In accordance with our present invention we have discovered that a mixture of pentaborane-9 and pentaborane-11, the mixture containing a high percentage of pentaborane-11, can be reacted with lower alkyl monohalides in admixture with an alkylation catalyst to form liquid reaction products. The alkyl halides used can contain from 1 to 5 carbon atoms. The reaction products formed in accordance with our invention are of relatively high boron content and at the same time they are liquids having a somewhat lower vapor pressure than either pentaborane-9 or pentaborane-11, so that they constitute a conveniently handled fuel.

In carrying out the process of our invention, a mixture of pentaborane-9 and pentaborane-11 containing from 70 to 90 mole percent pentaborane-11 can be employed. The preparation of the mixture of pentaborane-9 and pentaborane-11 is disclosed in the art. For example, the article by A. B. Burg and H. I. Schlesinger, Journal of the American Chemical Society, volume 55, page 4009 (1933) describes the pyrolysis of diborane at a temperature of about 100–130° C. to produce a reaction product from which materials other than pentaboranes can be easily separated, leaving a mixture consisting essentially of about 80 mole percent of pentaborane-11 and 20 mole percent of pentaborane-9.

Among the alkyl monohalides which can be employed in the process of our invention are ethyl bromide, normal propyl chloride, and normal butyl chloride, as well as ethyl fluoride, ethyl chloride, ethyl iodide, normal propyl bromide, normal propyl iodide, isopropyl bromide, isopropyl chloride, isopropyl iodide, normal butyl bromide, isobutyl bromide, secondary butyl chloride, tertiary butyl iodide and normal amyl chloride, normal amyl bromide and the like. Mixtures of the various alkyl monohalides can also be employed. In general, the molar ratio of alkyl monohalide to pentaborane, including both pentaborane-11 and pentaborane-9, introduced into the reaction system, will be within the range from 1 to 6, although somewhat lower and somewhat higher molar ratios can also be utilized.

The presence of an alkylation catalyst of the Friedel-Crafts type is essential in carrying out our process, inasmuch as no reaction takes place in the absence of such a catalyst. The preferred catalysts are aluminum chloride and aluminum bromide. Mixtures thereof with hydrogen chloride, hydrogen fluoride or sulfuric acid can also be employed. Usually, from about .04 to about 0.4 parts by weight of catalyst per part by weight of pentaboranes will be employed and the reaction temperature will usually be within the range from about 0° C. to 50° C.

The order of addition of the reagents to the reaction vessel appears to be immaterial. For convenience, the alkyl halide can be added to the vessel after the catalyst has been introduced, and the pentaborane-11 thereafter introduced as a gas. A convenient laboratory method is to introduce all these reagents in this order, condense the entire contents of the vessel with liquid nitrogen, and allow the vessel to warm up to room temperature so that reaction takes place. The entire reaction is complete within about thirty minutes from the time the liquid nitrogen is removed. Only about ten minutes are required for completion after the reaction vessel has reached room temperature.

The reaction becomes vigorous at about room temperature, causing a considerable rise in the pressure of the contents of the vessel. The vigor subsides as the reaction approaches completion. Although the reaction is nearly complete in about ten minutes, it proceeds slowly to completion thereafter.

The reaction product can be fractionated by passing the vapors through a pair of condensate traps maintained at −80° C. and −196° C., respectively, in a high vacuum system. The condensate collected in the first trap, which is maintained at −80° C., can then be refractionated through a pair of condensate traps maintained at approximately −35° C. and −80° C., respectively. The condensate in the trap maintained at −196° C. may be refractionated through a pair of traps maintained at −135° C. and −196° C., respectively. The reaction product of pentaborane-11 and lower alkyl halides is collected as a liquid in the fraction condensed at −35° C. The temperatures may be varied slightly from those given.

The foregoing fractionation procedure is described as one method of fractionation. Various other fractionation techniques may be used.

The process of this invention will now be described with reference to specific examples. In all of these examples the pentaborane "reagent" was a mixture consisting essentially of about 80 percent by volume of $B_5H_{11}$ and 20 percent $B_5H_9$. The same type of apparatus was used in all of the examples. This apparatus had a reaction vessel connected to a manifold having a plurality of sections. Gas-tight connections between the reaction vessel and manifold, and between manifold sections, could be opened or closed as desired. For fractionation of the reaction products the reaction vessel was connected to a high vacuum line having a plurality of condensate traps.

Combustion analyses in all of the examples were made according to the procedure described in an article by H. C. Brown and H. I. Schlesinger, and A. D. Burg, Journal of the American Chemical Society, volume 61, page 673 (1939). In all of these examples, volumes of gases are given in cubic centimeters at standard temperature and pressure (0° C. and one atmosphere).

Example I

A mixture of 50.5 cc. of ethyl bromide (measured as a gas at S.T.P.) and 0.07 g. of aluminum chloride was introduced into an evacuated reaction vessel having a volume of about 175 ml. Thereafter 53.3 cc. of pentaborane reagent (measured as a gas at S.T.P.) were introduced into the reaction vessel. The reaction was allowed to proceed for one hour, and the temperature was maintained at 19° C. At the end of one hour, the pressure in the reaction vessel was 568 mm. of mercury. After one hour, the gaseous products originally contained in the reaction vessel were allowed to expand into a manifold section and occupied a volume of about 230 ml. The reaction proceeded for an additional hour. At the end of the second hour, the pressure in the system was 266 mm. The reaction was stopped by cooling the vessel with liquid nitrogen. This resulted in condensation of all substances in the system except 10 cc. of hydrogen, which was removed.

The reaction products were allowed to vaporize and were fractionated by means of a pair of condensate traps in series, maintained at —80° C. and —196° C., respectively. The vapors passing through the trap at —80° C., mostly ethane as determined by infrared analysis, were collected at —196° C. and had a vapor volume of 61.5 cc. The condensate collected at —80° C. was refractionated by repeated fractionation through a trap maintained at —29° C. on the last pass. The liquid condensate at —29° C. constituted the final product.

Combustion analysis of the final product which was collected in the condensate trap at —29° C. was as follows:

|  | Percent by weight |
|---|---|
| Boron | 49.4 |
| Carbon | 9.3 |
| Hydrogen | 6.2 |
| Balance (undetermined) | 36.1 |

The undetermined balance is believed to be primarily bromine.

Example II

A mixture of 90.1 cc. of pentaborane reagent (measured as a gas at S.T.P.) and 82.5 cc. of normal propyl chloride (measured as a gas at S.T.P.) was introduced into an evacuated reaction vessel having a volume of 171 ml. and containing 0.1097 g. of aluminum chloride. The temperature of the vessel was maintained at —196° C. by means of liquid nitrogen during the addition of the pentaborane-propyl chloride mixture. The liquid nitrogen refrigerant was removed, and the vessel was allowed to warm up to room temperature. In ten minutes the vessel had reached room temperature. The rapid rise in temperature was indicative that reaction was taking place, and the reaction mixture had a pressure of 0.5 atmosphere. The reaction substances were condensed and revaporized by chilling the reaction vessel briefly with liquid nitrogen, and allowing the vapors to expand into a manifold section having a volume of about 700 ml. The reaction proceeded smoothly for an additional 15 minutes, at which time the reaction mixture was confined to a volume of only 331 ml. by condensation and revaporization. After an additional period of 25 minutes the total pressure in the system was 247 mm. of mercury and the reaction appeared to have subsided almost completely. The reaction mixture was frozen by means of liquid nitrogen, causing condensation of all components except hydrogen, which had a pressure of about 1 to 2 mm. The hydrogen was removed. The reaction products were allowed to warm up and vaporize, and were fractionated under vacuum into liquid and vapor fractions at —80° C. by means of a condensate trap. The vapor fraction was collected in a second condensate trap at —196° C. This vapor fraction was further separated into fractions condensable at —139° C. and —196° C. The former had a vapor volume of 82.5 cc. and was principally propane. The latter had a vapor volume of 17.7 cc. and was principally hydrogen chloride. The condensate originally collected at —80° C. was refractionated into fractions, which were liquid and vapor, respectively, at —30° C., by repeated fractionation through a condensate trap. The vapor which passed through the trap at —30° C. had a volume of 18.7 cc. and was primarily $B_5H_{11}$. The principal reaction product was collected as liquid condensate in the trap at —30° C. The condensate had a volume of approximately 0.5 ml. and a vapor pressure of 4 mm. at 0° C.

The condensate at —30° C. was analyzed by methanolysis as follows: Two samples, weighing 27.8 mg. and 30.1 mg., respectively, were each introduced into reaction flasks containing 3 ml. of methanol and maintained at —196° C. The flasks were closed and warmed to room temperature, and reaction took place. The hydrogen evolved was determined by measuring the pressure in the reaction vessel with a manometer at 0° C. both before and after withdrawal of the hydrogen from the flask. The flasks were chilled to —196° C. during withdrawal of hydrogen. After the second manometer reading on each flask was taken, the flask contents were poured into a large excess of water. The boron was determined by standing mannitol, and chloride was measured by silver titration according to Volhard's method. Hydrogen is evolved from both the sample under analysis and methanol in this procedure. The results of methanolysis were as follows:

|  | Sample 1 | Sample 2 |
|---|---|---|
| Hydrolyzable hydrogen millimoles per gram | 121 | 125 |
| Boron, percent by weight | 64.3 | |
| Chlorine, percent by weight | [1] 29 | 26.8 |

[1] Approximate.

Combustion analysis showed the following:

|  | Percent by weight |
|---|---|
| Boron | 53.1 |
| Carbon | 9.6 |
| Hydrogen | 15.0 |
| Total | 77.7 |

Results of methanolysis indicate that the balance is chlorine. The presence of chlorine does not interfere with the combustion analysis.

Example III

A mixture of 30.0 mg. of aluminum chloride, 58.1 cc. of normal butyl chloride (measured as a gas at S.T.P.), and 65.5 cc. of pentaborane reagent (measured as a gas at S.T.P.) consisting essentially of 80 percent by weight of $B_5H_{11}$, balance $B_5H_9$, were introduced into an evacuated reaction tube having a volume of 325 ml. The reagents were introduced into the reaction vessel separately while the vessel was maintained at a temperature of about 196° C. The vessel was thereafter allowed to warm up to a temperature of 21° C., and was maintained at this temperature for 45 minutes while reaction took place. At the end of this period, the reaction appeared to be complete. The reaction products were condensed with liquid nitrogen, and a small amount of hydrogen in the vessel was removed.

The condensed products were allowed to vaporize by exposure of the reaction vessel to ambient conditions. The vapors were vacuum fractionated through a pair of condensate traps maintained at —80° C., and the vapors passing through this trap were condensed at —196° C.

Condensate collected at —196° C. was fractionated by passage through a trap at —137° C. and the vapors passing through this trap were collected at —196° C. The condensate at —137° C. was principally butane and had a vapor volume of 60.3 cc. The —196° C. condensate which had a volume of 7.7 cc. was principally a 1:1 mixture of diborane and hydrogen chloride.

The condensate collected at —80° C. in the first fractionation was refractionated three times by passage of the condensate vapors through a trap which was maintained at —27° C. on the final pass. The vapor portion was essentially unreacted pentaborane-11. The condensate collected at —27° C. weighed 75.6 mg. and had a vapor pressure of 3.5 mm. at 0° C. A portion of this liquid product, which was the principal reaction product, was reacted with methanol as described in Example II with the following results:

Hydrolyzable hydrogen, millimoles per gram _____ 118
Boron, percent by weight _____ 49.5
Chlorine, percent by weight _____ 24.5

A combustion analysis with another sample of the reaction product was made. The results are as follows:

Percent by weight
Boron _____ 54.1
Carbon _____ 13.2
Hydrogen _____ 10.3

Total _____ 77.6

The balance is chlorine as determined in the methanolysis analysis.

The compositions produced in accordance with our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The compositions produced in accordance with our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15:1 or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.912 to 0.020 across a combustion system when the fuel employed is a simple hydrocarbon, rather than a borohydrocarbon produced in accordance with the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels produced in accordance with the present invention, the local fuel to air ratio in the zone of fuel injection should also be approximately stoichiometric, assuming that the boron, carbon and hydrogen present in the products burn to boric oxide, carbon dioxide and water vapor. In the case of Sample 1 produced as described in Example III containing 64.3 percent by weight of boron, for example, this local fuel to air ratio by weight is approximately 0.070. For the higher energy fuels produced in accordance with the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products produced in accordance with the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products produced in accordance with our invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon and hydrocarbon fuel present in the mixture, and consistent with the air dilution required to maintain the gas temperatures of these mixtures within accepted turbine operating conditions.

Because of their high chemical reactivity and heating values, the products produced in accordance with our invention can be employed as fuels in ramjet engines and in afterburning and other auxiilary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products produced in accordance with our invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas-turbine afterburner combination is also possible because the high chemical reactivity of the products produced in accordance with our invention eliminates the need of flameholding devices within the combustion zone of the afterburner. When employed in an afterburner, the fuels produced in accordance with our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products produced in accordance with our invention will improve the combustion process of the ramjet in much the same manner as that described for the afterburner because of their improved chemical reactivity over that of simple hydrocarbon fuels. When employed in a ramjet the fuels produced in accordance with our invention will be simply substituted for hydrocarbon fuels and used in the established manner.

We claim:

1. A method for the preparation of a liquid reaction product of an alkyl halide and a pentaborane which comprises reacting an alkyl monohalide having from 1 to 5 carbon atoms and a mixture consisting essentially of from 10 to 30 mole percent of pentaborane-9 and from 90 to 70 mole percent of pentaborane-11 while the reactants are in admixture with a material selected from the group consisting of aluminum chloride and aluminum bromide as an alkylation catalyst.

2. The method of claim 1 wherein said monohalide is ethyl bromide.

3. The method of claim 1 wherein said monohalide is normal propyl chloride.

4. The method of claim 1 wherein said monohalide is normal butyl chloride.

5. The method of claim 1 wherein said catalyst is aluminum chloride.

6. The method of claim 1 wherein the reaction is conducted at a temperature within the range from about 0 to 50° C.

No references cited.

Dedication 2,987,554.—*Arthur Levy*, Worthington, Ohio, and *Earl A. Weilmuenster*, Kenmore, N.Y. PROCESS FOR PREPARING A LIQUID REACTION PRODUCT OF AN ALKYL HALIDE AND A PENTABORANE. Patent dated June 6, 1961. Dedication filed Aug. 2, 1974, by the assignee, *The Battelle Development Corporation*.

Hereby dedicates to the People of the United States the entire remaining term of said patent.

[*Official Gazette March 11, 1975.*]